United States Patent [19]

Barnard

[11] 4,441,372

[45] Apr. 10, 1984

[54] VORTEX FLOWMETER

[75] Inventor: Richard H. Barnard, St. Albans, England

[73] Assignee: ITT Industries, Inc., New York, N.Y.

[21] Appl. No.: 375,350

[22] Filed: May 5, 1982

[30] Foreign Application Priority Data

May 14, 1981 [GB] United Kingdom ............... 8114740
Feb. 23, 1982 [GB] United Kingdom ............... 8205243

[51] Int. Cl.³ .............................................. G01F 1/32
[52] U.S. Cl. .................................................. 73/861.22
[58] Field of Search ............ 73/861.22, 861.23, 861.24

[56] References Cited

U.S. PATENT DOCUMENTS

| 3,572,117 | 3/1971 | Rodley | 73/861.22 |
| 3,589,185 | 6/1971 | Burgess | 73/861.22 |
| 3,867,839 | 2/1975 | Herzl | 73/861.24 |
| 3,972,232 | 8/1976 | Miller et al. | 73/861.24 |
| 4,285,247 | 8/1981 | Klobe | 73/861.24 |

Primary Examiner—Herbert Goldstein
Attorney, Agent, or Firm—T. E. Kristofferson; A. D. Stolzy

[57] ABSTRACT

An elongate body extends as a bar across a fluid flow passage and has a vortex shedding tapered head portion pointing upstream and a tail portion downstream of the head. The head has an axial length equal to or less than half the head width. The tail has a width less than head width throughout its length. A sensor is arranged downstream of the head. For example, the sensor may be in the tail portion of the body such as to sense the vortices produced alternately on the side surfaces. The frequency output of the sensor is proportional to the relative speed between the elongate body and the fluid. The arrangement can be used as a fluid flowmeter or a ship's log.

7 Claims, 2 Drawing Figures

VORTEX FLOWMETER

BACKGROUND OF THE INVENTION

This invention relates to a device which employs vortex shedding for measuring the relative speed between the device and a surrounding fluid.

Such devices may be used to determine the relative speed of a body through a fluid, as in a ship's log, or to determine the relative speed of a fluid past a stationary body, as in a fluid flowmeter. The relative speed is determined from measurements of the frequency at which vortices are shed from an obstruction in the fluid stream. The term "fluid" employed herein is hereby defined to include both liquids and gases.

PRIOR ART STATEMENT

Various vortex flowmeters are well known. Typically they comprise a bluff body disposed in a fluid stream, and means for detecting the frequency of shedding of vortices produced by the interaction of the fluid with the body. As the principles of operation of vortex flowmeters are well known in the art and have been exploited commercially for a number of years, such principles of operation will not be described herein.

SUMMARY OF THE PRESENT INVENTION

Although many prior art bluff body configurations will shed vortices at a frequency that is very nearly directly related to the flow rate, the present invention resides in certain geometric configurations that have been found to give exceptionally good, very strong and highly regular shedding of the vortices. The configuration of the present invention produces a regular shedding of vortices with a lower loss of total energy in the fluid stream than that given by other published designs of similar geometric blockage. The bluff body of the present invention is also well suited for use with some preferred versions of the type of vortex shedding frequency sensor employing fiber optics.

According to the present invention, there is provided a device and means for measuring the relative speed between the device and surrounding fluid. An elongate body for extending across a passageway is provided for fluid flow. The body is constructed to shed vortices. A sensor is provided to sense the vortices and to provide an output signal representative of the relative speed, the elongate body having a cross-sectional shape including a tapered head with the taper pointing away from the sensor and a tail portion downstream of the head. The tail portion has a width smaller than the head width throughout its length, the head having an axial length equal to or less than half the head width.

BRIEF DESCRIPTION OF THE DRAWINGS

In the accompanying drawings which illustrate exemplary embodiments of the present invention.

DESCRIPTION OF THE PREFERRED EMBODIMENTS

Figure 1:
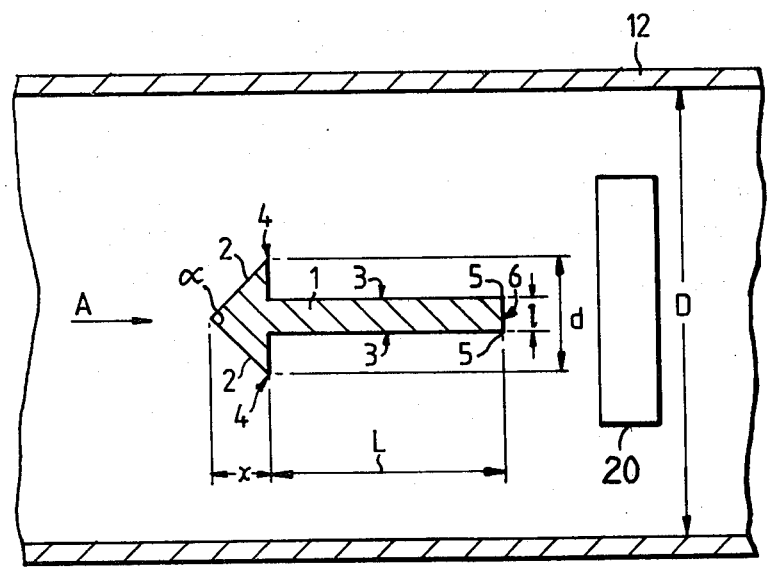
FIG. 1 is a longitudinal sectional view of a bluff body arranged in a passageway.

In FIG. 1 a bluff body 1 extends as a bar in front of a conventional vortex sensor 20 across a pipe 12 defining a passage for fluid flow in the direction of an arrow A. Lead faces 2 of bluff body 1 are arranged to make an included angle $\alpha$ that is greater than 90°, but less than 180°. This feature has been found to reduce significantly the total energy loss through a flowmeter incorporating such a passage and body in comparison to flowmeters using bodies of a similar configuration, i.e., bodies having the same ratio of bluff body cross-stream depth (head width) d to pipe diameter D, but with a flat leading face. If the included angle $\alpha$ between the leading faces 2 is less than 90° and other dimensions are within the ranges specified below, then the vortex shedding becomes ill-defined in frequency, and irregular in terms of the response that it generates in sensor 20. As angle $\alpha$ approaches 180°, the energy loss increases and the energy loss reduction advantage is gradually lost. For $\alpha = 90°$ x the axial length of the head portion of the bluff body is half the head width d, for $\alpha$ greater than 90° x is less than d/2.

The side faces 3 are preferably parallel as shown in the drawing, but may be inclined. With the side faces 3 parallel, as illustrated, however, this bluff body configuration is particularly well suited for integral use with some versions of certain fiber-optic vortex sensors (pressure sensors). Such sensors involve the use of parallel diaphragms. It is an advantage that such diaphrams be flush with the bluff body side faces 3 so as to prevent the formation of crevices in which dirt or other deposits may accumulate. However, the bluff body may alternatively be employed with other sensors which sense the vortices and produce an output signal representative of the speed of fluid flow through the pipe 12. Many different sensors exist, and are well known in the art.

The streamwise distance L between the corners 4 and the corners 5 may be anywhere in the range of one-half to twice that of the maximum cross-stream dimension d. The most regular shedding of vortices occurs, however, when distance L is in the region of 1.4 times that of dimension d. The distance l between the corners 5 (tail width) may vary between a value approaching zero and a value equal to $\frac{1}{2}$ d with the sides preferably parallel. Not all combination of dimensions d, L and l within the specified ranges will give good regular vortex shedding, but with the dimensions d and L in the region of the ratio 1:1.4 and the dimensions d and l simultaneously in the region of the ratio 1:0.33, good regular vortex shedding occurs.

A meter using a bluff body of the type described above (FIG.1) is hereinafter referred to as having an arrow shape.

In the case of triangular cross-sectioned tapered heads, the angle $\alpha$ between the leading faces thereof is preferably, but not exclusively, in the range 100° to 140°.

Bluff body sections other than those shown in FIG. 1 may be employed. It is not necessary that the head of the bluff body be pointed or be arrow-shaped.

Figure 2:
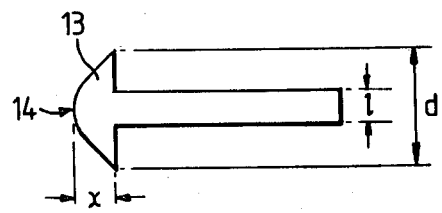
FIG. 2 is a side elevational view of an alternative embodiment of the present invention.

FIG. 2 shows an alternative bluff body in which a head 13, while tapering in the upstream direction, is rounded rather than pointed at its tip 14. Other symmetrical tapering configurations are possible such as those which include more rounded heads, or heads whose sections comprise a series of curves or lines joining their tips to the maximum width portions. For all of these configurations, including those shown in FIGS. 1 and 2, the axial length of the head x is equal to or less than half the head width d.

The invention has been described with respect to a vortex flowmeter in which the speed of fluid flow through a passage is determined. It may alternatively be employed to determine the relative speed of a body in a fluid as in a ship's log.

What is claimed is:

1. Velocity measurement apparatus comprising: a passageway; an elongate vortex shedding bluff body extending across said passageway, said passageway being adapted to carry a flow of a fluid; and a sensor downstream of said bluff body to sense vortices produced by said bluff body, said sensor producing an output signal directly proportional to the speed of said fluid relative to said bluff body, said bluff body having a cross-sectional shape including a tapered head with the taper pointing away from said sensor and a tail portion downstream of said head and having a width along the entire length thereof, said tail portion width being smaller than the width of said head, said head having an axial length not greater than half of said head width.

2. The invention as claimed in claim 1, wherein said sensor is supported adjacent said tail portion to sense vortices on both sides thereof.

3. The invention as claimed in claim 1, wherein said tapered head is triangular in cross-section having an angle between the leading faces thereof approximately within the range of 100° to 140°.

4. The invention as claimed in claim 3, wherein the length of said tail portion is between about 0.5 to 2 times said head width.

5. The invention as claimed in claim 4, wherein the length of said tail portion is about 1.4 times said head width.

6. The invention as claimed in claim 5, wherein said tail portion has substantially parallel sides and a width less than half of said head width.

7. The invention as claimed in claim 6, wherein said tail portion width is about 0.33 times said head width.

* * * * *